United States Patent
Paley et al.

[11] Patent Number: 5,210,382
[45] Date of Patent: May 11, 1993

[54] BELLEVILLE WASHER SPRING TYPE PULSATION DAMPER, NOISE ATTENUATOR AND ACCUMULATOR

[75] Inventors: Edward D. Paley, Grosse Pointe; Gregory E. Leemhuis, Auburn Hills; Kerry A. Machesney, Farmington Hills, all of Mich.

[73] Assignee: Hydraulic Power Systems, Inc., Oak Park, Mich.

[21] Appl. No.: 749,272

[22] Filed: Aug. 23, 1991

[51] Int. Cl.⁵ .................................. F16F 15/00
[52] U.S. Cl. .............................. 181/209; 181/226; 181/233; 138/30; 138/31
[58] Field of Search ............... 181/207, 209, 233, 226, 181/230; 138/30, 31

[56] References Cited

U.S. PATENT DOCUMENTS

| Re. 31,480 | 1/1984 | Major | 137/544 |
|---|---|---|---|
| 2,049,487 | 8/1936 | Beeh | 137/145 |
| 2,411,315 | 11/1946 | Ashton | 138/31 |
| 2,682,893 | 7/1954 | Ziebold | 138/30 |
| 2,916,052 | 12/1959 | Peters | 138/30 |
| 3,159,182 | 12/1964 | Peters | 138/30 |
| 3,162,213 | 12/1964 | Peters | 138/30 |
| 3,273,577 | 9/1966 | Moore | 137/13 |
| 3,422,853 | 1/1969 | Schmid | 138/30 |
| 3,633,627 | 1/1972 | Perrolt | 138/31 |
| 4,667,699 | 5/1987 | Löliger | 138/31 |

Primary Examiner—Michael L. Gellner
Assistant Examiner—Khanh Dang
Attorney, Agent, or Firm—Basile and Hanlon

[57] ABSTRACT

A pulsation damper and noise attenuator assembly comprising a housing having an inlet port and an outlet port fluidly connecting the interior of the housing to the flow path of the fluid flow system. A base is mounted to the housing and comprises a vent fluidly connecting the interior of the housing to the atmosphere. A piston seated within the housing creates a fluid tight seal between the fluid flow path and the vented atmospheric pressure. Belleville springs bias the piston in a forward direction. The piston absorbs the full force of the hydraulic shock waves or pulsation within a high pressure fluid flow system as the assembly is mounted directly within the flow path of the fluid. The shock wave is exposed across the full face of the piston and dampened prior to the fluid continuing along the flow path.

16 Claims, 1 Drawing Sheet

BELLEVILLE WASHER SPRING TYPE PULSATION DAMPER, NOISE ATTENUATOR AND ACCUMULATOR

BACKGROUND OF THE INVENTION

I. Field of the Invention

The present invention relates to a pulsation damper and noise attenuator assembly for use in a fluid flow system. More particularly, the present invention relates to a pulsation damper and noise attenuator assembly that is mounted directly in the fluid flow path of the fluid flow system.

II. Description of the Prior Art

A pulsation damper and noise attenuator assembly is generally used in a fluid flow system to dampen or prevent development of pressure pulsations in a system where it is desired to continuously deliver fluids under pressure. Fluid pressure pumps, and, in particular positive displacement pumps create pressure pulsations during normal operation which can cause excessive strain and/or damage to the conduits and within the fluid system. Further, the airborne sound generated by the pulsation traveling through the conduit may be very loud and poses an annoyance or possible hazzard to the users of the hydraulic equipment.

To overcome these phenomenons, several prior art fluid devices have been developed. A disadvantage of these previous devices is that the apparatus is not placed directly in the flow path of fluid but is instead usually coupled to the end of a T shaped connection. Removing the prior art device from the fluid flow path prevents the device from absorbing the full force of the pulsation as the wave is not forced to flow directly through the device. Therefore, any pulsation that interrupts the fluid flow may not be suppressed by the device due to its indirect application in the flow path.

A further disadvantage is that the prior art devices is that they require a compression spring and piston assembly to absorb the pulsation within the fluid flow path. In order to sustain the relatively large forces that are imported on such assemblies, a very large coil compression spring is required. As a result, the device which houses the spring must also be very large.

A still further disadvantage of the prior art devices is that the fluid flow is not exposed to the complete surface area of the dampening device. That is, the path of the pulsation is not directed across the full face of the piston used to absorb the pulsation. Therefore, complete absorption or dampening of the pulsation is not provided by the prior art devices and, as such, the pulsation is allowed to dissipate throughout the entire fluid flow path.

SUMMARY OF THE PRESENT INVENTION

The present invention provides a pulsation damper and noise attenuator assembly which overcomes the disadvantages of the previously known fluid apparatuses.

Unlike the previously known fluid apparatuses, the present invention is mounted directly in the flow path of the pressure fluid.

The assembly of the present invention comprises a housing having an inlet port and an outlet port. The ports are fluidly connected by a fluid chamber within the interior of the housing such that the housing interior becomes part of the fluid flow system. A cover, threadably mounted on the housing comprises a cylindrical projection defining a chamber which in turn is vented to the atmosphere. A piston is slidably received within the cylindrical projection such that the forward portion of the section defines a pressure responsive area directly exposed to the fluid flow path.

A plurality of washer springs such as Belleville springs are mounted about the exterior of the covers cylindrical projection and bias the piston towards the housing fluid chamber.

An advantage of this assembly is that the fluid flow path is directed across the entire face of the piston, thereby receiving the full effect of the pressure increases caused by the pulsations. An advantage of the non-gas embodiments is that there is no need for concern for leakage of the gas and a drop in spring rate.

Further, since the stacked Belleville springs can sustain relatively large loads with small deflections, a smaller envelope of stacked springs (as compared to a coil spring) is required to resist the force which may be created by the pulsation acting against the pressure response area of the piston. Therefore, the use of Belleville springs eliminates the need for a larger coil compression spring of equivalent load bearing capacity. The area required by the Belleville springs is much smaller and reduces the size of the device itself.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DESCRIPTION OF THE PREFERRED EMBODIMENT

Figure 1:
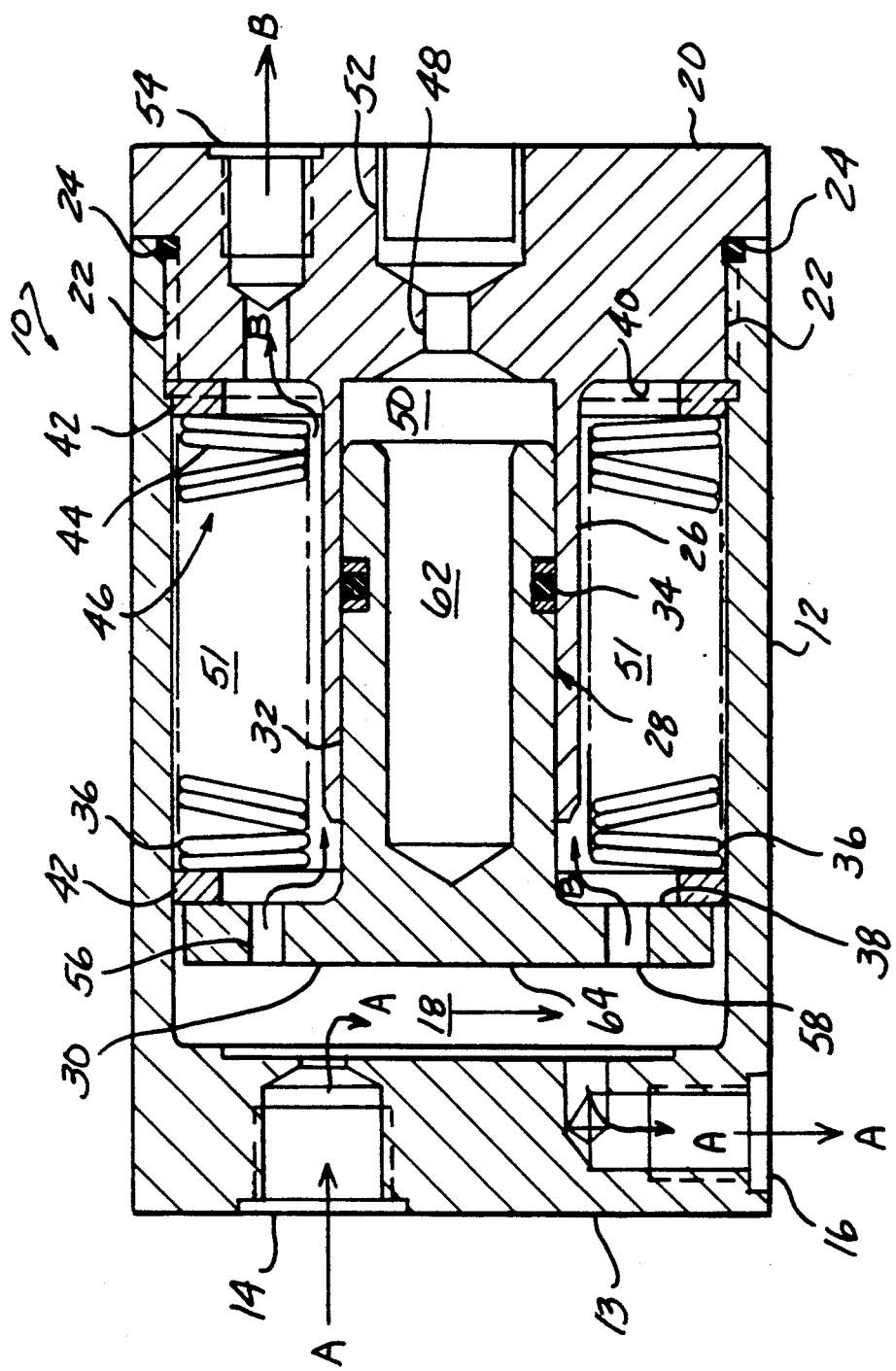
FIG. 1 is a longitudinal cross sectional view of a preferred embodiment of the present invention in the form of a pulsation damper and noise attenuator.

With reference to FIG. 1, a preferred embodiment of the present invention is illustrated as a pulsation damper and noise attenuator assembly 10 which is positioned in a fluid circuit as close as possible to the source of pressure pulsations, such as at the outlet side of a positive displacement pump.

The assembly 10 comprises a cylindrical housing 12 the side wall and base 13 thereof defining an interior chamber 18 which connects an inlet port 14 to an outlet port 16 to define the flow path A of a fluid flow system. For example, the fluid flow system could include a pump and a motor connected in a conventional open and/or closed loop system.

The assembly 10 further comprises a cover 20 threadably secured to the housing 12 by well known means such as external threads 22 and in which an elastomeric seal 24 is used to provide a fluid seal. Cover 20 may be attached by other means such as by welding.

The cover 20 further comprises a hollow cylinder 26 projecting inwardly into the interior chamber 18 of the housing 12. A piston 28 comprising a head 30 and a hollow projection 32 is slidably received within the cylinder 26.

The outside diameter of the piston head 30 is slightly smaller than the inside diameter of the housing 12 and extends radially beyond the cylinder 26. The outside diameter of the boss 32 is slidably received within the inside diameter of the cylinder 26. An elastomeric seal 34 seated about the projection 32 creates a fluid tight seal between the projection 32 and the interior 50 of the cylinder 26 all of which will be described in detail hereinafter.

A series of Belleville springs 36 are mounted in the housing interior chamber 18 in the annular space 51 defined by the inner wall of the housing 12 and the cylinder 26 and are seated between the cover facing side 38 of the piston 28 and an annular shoulder 40 of the cover 20. Spacer rings 42 support the Belleville springs 36 in position as shown biasing the piston 28 toward the housing base 13.

Belleville springs 36 can sustain relatively large loads with small deflections and the load magnitude and stiffness can be altered by the stacking arrangement of the springs 36. In the preferred embodiment, one set of springs 44 comprises two individual springs stacked one upon another in a parallel relationship. A second set of parallel springs 46 are also stacked one upon another and placed in an opposing orientation. This alternate stacking over the full length of the conduit reduces the spring rate of the total combination to the desired level. Other variations in spring stacking arrangements are possible depending on the application and desired spring characteristics.

The cover 20 has a vent 48 that fluidly connects the interior 50 of the cylinder 26 to the outside atmosphere. Mounting means 52, such as a socket, is provided within the cover 20 to facilitate securing the cover 20 to the housing 12. An alternate outlet port 54 is also provided within the cover 20 to allow for an alternate flow path B through the assembly 10. If the port 54 is in use then port 16 is plugged and vice-versa.

Piston 28 also comprises a plurality of apertures 56, 58 fluidly connecting the forward portion of the housing interior chamber 18 with the annular space 51 on the opposite side of the piston 28.

Piston 28 is spring biased towards the forward interior chamber 18 of the housing 12 by the Belleville springs 36. Piston ring seal 34 seals the cylinder 26 preventing the flow of fluid into the interior 50 of the cylinder 26 which, as aforementioned, is connected to the atmosphere via connection 48.

In the first preferred flow path A of the fluid flow system, fluid flows through inlet port 14 and is exposed to the full forward face 64 of the piston head 30 and is exhausted through the outlet 16. Pressure pulsation within the fluid acts against the pressure response area surface of the piston 28 creating a force urging the piston toward the cover 20 against the Belleville washers 36 which functions to minimize the effects of the pressure pulsation. The effective pressure responsive area of piston 28 is the cross sectional area of the interior 50 of cylinder 26.

The fluid flows through apertures 56, 58 and thus equalizes the force acting on the radial extension of the piston head 30.

The counter balancing of the piston 28 by the Belleville springs 44, 46 provides means to absorb the full force of the pulsation. Shock is reduced by the piston 28 movement within the cylinder 26.

An alternate flow path of the fluid flow within the fluid flow system is shown at B. In this second flow path, the action is the same as described hereinbefore except that the fluid flows through apertures 56, 58 and outward through an alternate outlet port 54. In this configuration the outlet port 16 is closed. Other locations of the outlet port may be provided to accommodate individual designs of the fluid flow path.

In related apparatuses the chamber 62 can be closed by a suitable check valve located in passage 48 and an inert gas such as $N_2$ can be used to provide a different spring rate.

Having described our invention, however, many modifications thereto will become apparent to those skilled in the art to which it pertains without deviation from the spirit of the invention as defined by the scope of the appended claims.

What is claimed is:

1. A pulsation damper and noise attenuator assembly for use in a fluid flow system comprising:
   a housing having an inlet port and an outlet port, said ports fluidly connecting an interior of said housing to a flow path of said fluid flow system;
   a base mounted to said housing and having a vent fluidly connecting said housing interior to the atmosphere, said base having a hollow cylinder extending inwardly from said base to said housing interior; and
   a piston slidably received within said housing interior and separating said housing interior into a forward housing area exposed to said fluid flow path and a rearward housing area exposed to said atmosphere, said piston having a boss fixedly mounted to one end, said boss slidably received within said cylinder and means for sealing said boss within said cylinder;
   wherein said fluid flow path is directed across an entire forward face of said piston.

2. The invention as defined in claim 1, said piston further comprising at least one aperture fluidly connecting said forward housing area with said rearward housing area.

3. A pulsation damper and noise attenuator assembly for use in a fluid flow system comprising:
   a housing having an inlet port and an outlet port, said ports fluidly connecting an interior of said housing to a flow path of said fluid flow system;
   a base mounted to said housing and having a vent fluidly connecting said housing interior to the atmosphere, said base having a hollow cylinder extending inwardly from said base to said housing interior;
   a piston slidably received within said housing interior and separating said housing interior into a forward housing area exposed to said fluid flow path and a rearward housing area exposed to said atmosphere; and
   spring means for biasing said piston toward said forward housing area;
   wherein said fluid flow path is directed across an entire forward face of said piston.

4. The invention as defined in claim 3, said pulsation damper and noise attenuator assembly wherein said spring means comprises a plurality of spring washers.

5. The invention as defined in claim 4, wherein said spring washers are Belleville springs.

6. A pulsation damper and noise attenuator assembly for use in a fluid flow system comprising:

a housing having an inlet port and an outlet port, said ports fluidly connecting an interior of said housing to a flow path of said fluid flow system;

a base mounted to said housing and having a vent fluidly connecting said housing interior to the atmosphere, said base having a hollow cylinder extending inwardly from said base to said housing interior; and an alternate outlet port fluidly connecting said housing interior with said fluid flow path; and a piston slidably received within said housing interior and separating said housing interior into a forward housing area exposed to said fluid flow path and a rearward housing area exposed to said atmosphere;

wherein said fluid flow path is directed across an entire forward face of said piston.

7. A pulsation damper and noise attenuator assembly for use in a fluid flow system comprising:

a housing having an inlet port and an outlet port, said ports fluidly connecting an interior of said housing to a flow path of said fluid flow system;

a base mounted to said housing and having a vent fluidly connecting said housing interior to the atmosphere, said base having a hollow cylinder extending inwardly from said base to said housing interior; and a piston slidably received within said housing interior and separating said housing interior into a forward housing area exposed to said fluid flow path and a rearward housing area exposed to said atmosphere; said piston having a boss fixedly mounted to one end, said boss slidably received within said cylinder and means for sealing said boss within said cylinder;

wherein said assembly is mounted directly in the fluid flow path of said fluid flow system.

8. The invention as defined in claim 7, said piston further comprising at least one aperture fluidly connecting said forward housing area with said rearward housing area.

9. A pulsation damper and noise attenuator assembly for use in a fluid flow system comprising:

a housing having an inlet port and an outlet port, said ports fluidly connecting an interior of said housing to a flow path of said fluid flow system;

a base mounted to said housing and having a vent fluidly connecting said housing interior to the atmosphere, said base having a hollow cylinder extending inwardly from said base to said housing interior;

a piston slidably received within said housing interior and separating said housing interior into a forward housing area exposed to said fluid flow path and a rearward housing area exposed to said atmosphere; and a plurality of spring washers mounted about said cylinder and biasing said piston toward said forward housing area;

wherein said assembly is mounted directly in the fluid flow path of said fluid flow system.

10. The invention as defined in claim 9, said pulsation damper and noise attenuator assembly further comprising means for retaining said spring washers about said cylinder.

11. The invention as defined in claim 9, wherein said spring washers are Belleville springs.

12. A pulsation damper and noise attenuator assembly for use in a fluid flow system comprising:

a housing having an inlet port and an outlet port, said ports fluidly connecting an interior of said housing to a flow path of said fluid flow system;

a base mounted to said housing and having a vent fluidly connecting said housing interior to the atmosphere, said base having a hollow cylinder extending inwardly from said base to said housing interior; and an alternate outlet port fluidly connecting said housing interior with said fluid flow path; and a piston slidably received within said housing interior and separating said housing interior into a forward housing area exposed to said fluid flow path and a rearward housing area exposed to said atmosphere;

wherein said fluid flow path is directly in the fluid flow path of said fluid flow system.

13. A pulsation damper and noise attenuator assembly for use in a fluid flow system comprising:

a housing having an inlet port and an outlet port, said ports fluidly connecting an interior of said housing to a flow path of said fluid flow system;

a base mounted to said housing and having a vent fluidly connecting said housing interior to the atmosphere and a hollow cylinder extending inwardly from said base to said housing interior;

a piston slidably received within said housing interior and separating said housing interior into a forward housing area exposed to said fluid flow path and a rearward housing area exposed to said atmosphere;

a plurality of spring washers mounted about said cylinder and biasing said piston toward said forward housing area; and a plurality of retaining washers mounted on either side of said spring washers to retain said spring washers about said cylinder;

said piston further comprising a boss fixedly mounted to one end, said boss slidably received within said cylinder and comprising means for sealing said boss within said cylinder, and at least one aperture fluidly connecting said forward housing area with said rearward housing area;

wherein said assembly is mounted directly in the fluid flow path of said fluid flow system and said fluid flow path is directed across an entire forward face of said piston.

14. The invention as defined in claim 13, wherein said spring washers are Belleville springs.

15. The invention as defined in claim 13, said base further comprising an alternate outlet port fluidly connecting said housing interior with said fluid flow path.

16. The invention as defined in claim 13 wherein the fluid flow path surrounds said cylinder.

* * * * *